(12) United States Patent
Mograbi

(10) Patent No.: US 8,929,724 B1
(45) Date of Patent: Jan. 6, 2015

(54) HIGH EFFICIENCY OVEN AND METHOD OF USE

(75) Inventor: Shawki H. Mograbi, Plano, TX (US)

(73) Assignee: J.C. Penney Purchasing Corporation, Inc., Plano, TX (US)

(*) Notice: Subject to any disclaimer, the term of this patent is extended or adjusted under 35 U.S.C. 154(b) by 338 days.

(21) Appl. No.: 13/366,357

(22) Filed: Feb. 6, 2012

Related U.S. Application Data

(60) Provisional application No. 61/440,307, filed on Feb. 7, 2011.

(51) Int. Cl.
| | | |
|---|---|---|
| *A21B 2/00* | (2006.01) | |
| *A21B 1/14* | (2006.01) | |
| *F24C 7/06* | (2006.01) | |
| *F24C 15/22* | (2006.01) | |
| *F24C 7/08* | (2006.01) | |
| *F24C 7/04* | (2006.01) | |

(52) U.S. Cl.
CPC . *A21B 2/00* (2013.01); *F24C 7/085* (2013.01); *A21B 1/14* (2013.01); *F24C 7/04* (2013.01); *F24C 7/065* (2013.01)
USPC ............ 392/416; 219/405; 219/411; 219/486

(58) Field of Classification Search
None
See application file for complete search history.

(56) References Cited

U.S. PATENT DOCUMENTS

| | | | | |
|---|---|---|---|---|
| 4,441,015 | A * | 4/1984 | Eichelberger et al. | 219/411 |
| 4,623,781 | A * | 11/1986 | Thomas | 219/413 |
| 4,771,154 | A * | 9/1988 | Bell et al. | 219/685 |
| 5,990,454 | A * | 11/1999 | Westerberg et al. | 219/411 |
| 6,069,345 | A * | 5/2000 | Westerberg | 219/411 |
| 6,333,492 | B1 * | 12/2001 | Graves et al. | 219/413 |
| 6,750,433 | B2 * | 6/2004 | Guenther et al. | 219/506 |
| 6,933,477 | B2 * | 8/2005 | Becker et al. | 219/506 |
| 7,126,088 | B2 * | 10/2006 | Horton et al. | 219/412 |
| 7,231,871 | B1 * | 6/2007 | Wilbers | 99/325 |
| 7,323,663 | B2 * | 1/2008 | Cavada et al. | 219/411 |
| 7,461,588 | B2 * | 12/2008 | Head | 99/326 |
| 7,683,292 | B2 * | 3/2010 | Cavada et al. | 219/411 |
| 7,800,023 | B2 * | 9/2010 | Burtea et al. | 219/411 |
| 2004/0250688 | A1 * | 12/2004 | Farkas et al. | 99/386 |
| 2005/0173400 | A1 * | 8/2005 | Cavada et al. | 219/411 |
| 2006/0051078 | A1 * | 3/2006 | Bonnin et al. | 392/423 |
| 2006/0118983 | A1 * | 6/2006 | Cochran et al. | 264/40.6 |
| 2008/0029503 | A1 * | 2/2008 | Cavada et al. | 219/411 |
| 2009/0301461 | A1 * | 12/2009 | Taplan et al. | 126/19 R |
| 2011/0002677 | A1 * | 1/2011 | Cochran et al. | 392/416 |
| 2012/0063752 | A1 * | 3/2012 | Cochran | 392/416 |

FOREIGN PATENT DOCUMENTS

| | | | | |
|---|---|---|---|---|
| JP | 03125820 | A * | 5/1991 | |
| JP | 2010022625 | A * | 2/2010 | |

* cited by examiner

*Primary Examiner* — Joseph M Pelham
(74) *Attorney, Agent, or Firm* — Bill R. Naifeh

(57) ABSTRACT

A high efficiency oven is disclosed. An exemplary high efficiency oven includes two or more infrared heating elements selected to generate different wavelengths in an oven cavity, a temperature sensor, and a system controller.

11 Claims, 11 Drawing Sheets

HIGH EFFICIENCY OVEN AND METHOD OF USE

CROSS REFERENCE TO RELATED APPLICATIONS

This application claims the benefit of the filing date of U.S. provisional patent application Ser. No. 61/440,307, filed on Feb. 7, 2011, the disclosure of which is incorporated herein by reference for all purposes.

BACKGROUND

Infrared radiation transfers thermal energy in the form of electromagnetic waves. Certain characteristics of infrared heating such as fast heating response time, wavelength, and reflectivity set it apart from conventional heating. Infrared radiation technology has been adapted to cooking appliances. However, the infrared oven industry currently faces the challenge of achieving high energy efficiency without adversely impacting cooking quality. Therefore, a need exists for a high efficiency oven that reduces undercooking or overcooking and achieves high cooking quality.

SUMMARY OF THE DISCLOSURE

In response to these and other problems, in one embodiment, there is disclosed a high efficiency oven. An exemplary high efficiency oven includes two or more infrared heating elements selected to generate different wavelengths in an oven cavity, a temperature sensor, and a system controller.

These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
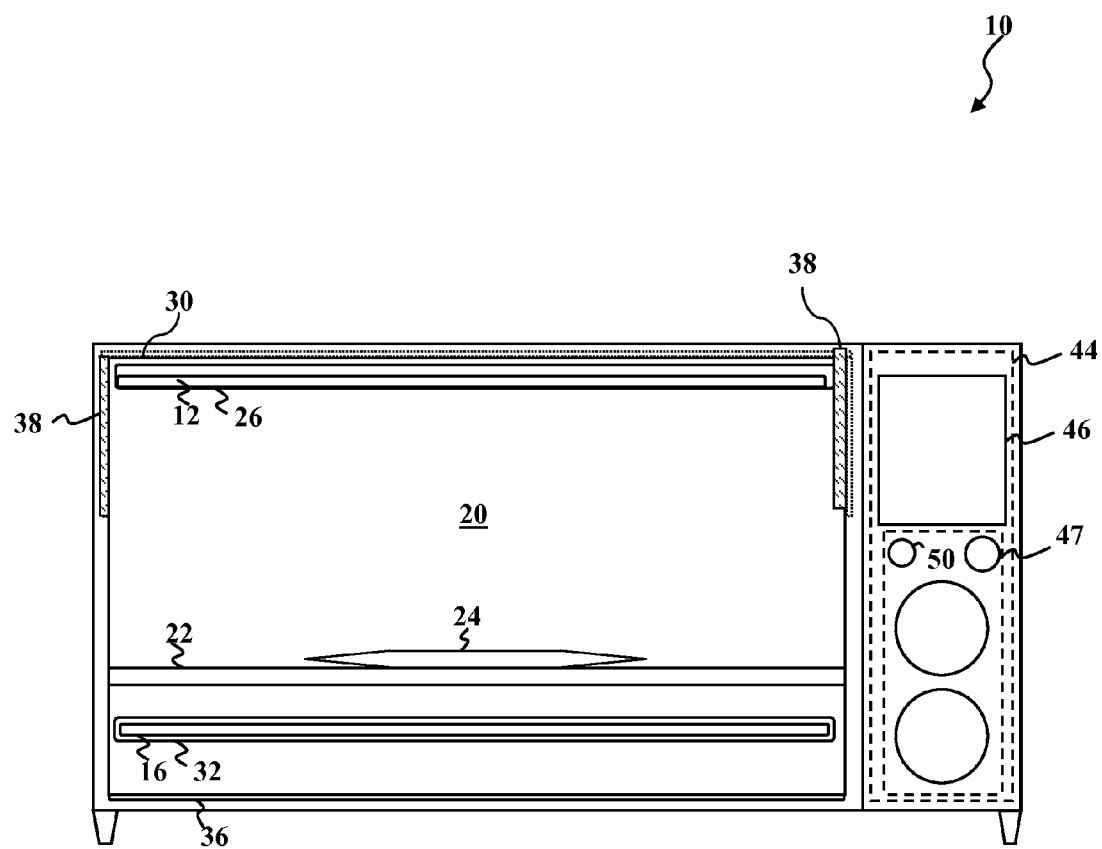
FIG. 1 is a front view of a high efficiency oven in accordance with one embodiment of the present disclosure.
Figure 2:
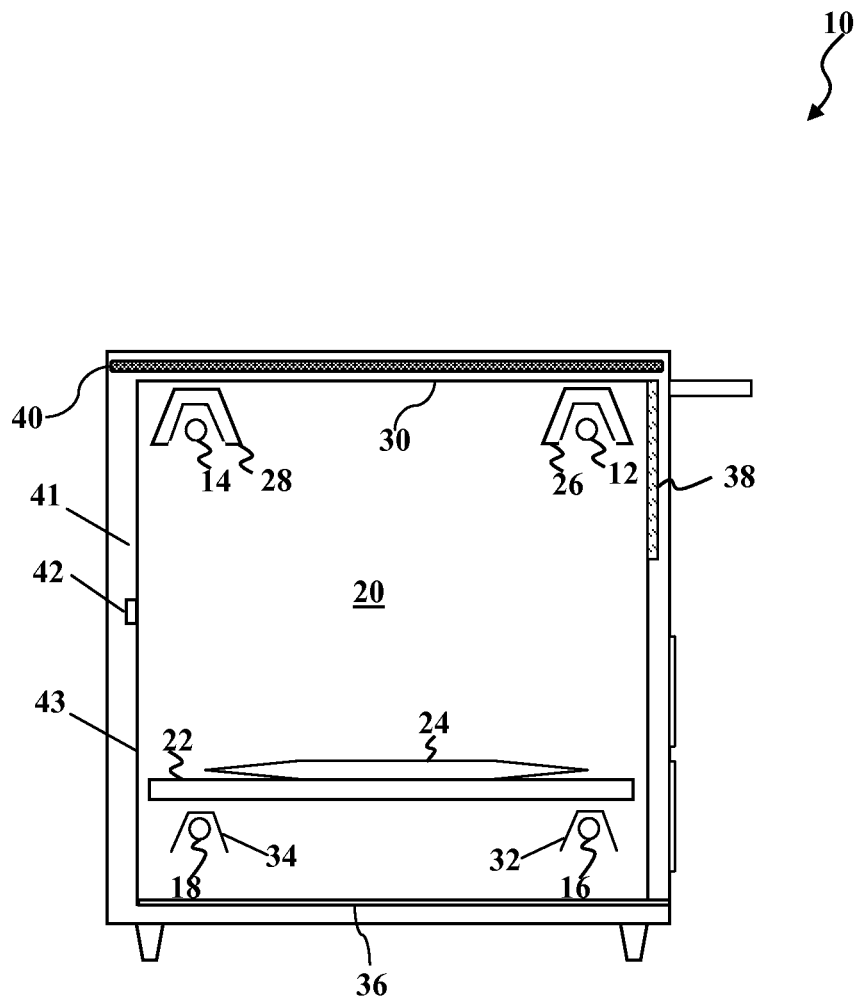
FIG. 2 is a cross-sectional view of the high efficiency oven of FIG. 1 according to aspects of the present disclosure.

FIG. 1 is a front view of an embodiment of a high efficiency oven 10 according to aspects of the present disclosure. FIG. 2 is a cross-sectional view of an embodiment of the high efficiency oven 10 shown in FIG. 1. The oven 10 may include conventional and additional features not described in detail herein. Further, the present disclosure is applicable to other types of cooking apparatuses, now known or to be developed.

As shown in FIGS. 1 and 2, the infrared oven 10 comprises upper infrared heating elements 12 and 14 and lower quartz heating elements 16 and 18. The infrared oven 10 further comprises an oven cavity 20 and a food rack 22, and the food rack 22 is located in the oven cavity 20. The upper infrared heating elements 12 and 14 are located in the upper portion of the oven cavity 20 and are operable to emit infrared radiant heat directly onto a food item 24 placed on the food rack 22. The upper infrared heating elements 12 and 14 are disposed approximate to respective top reflectors 26 and 28, which may be located between the upper infrared heating elements 12 and 14 and an upper wall 30 of the oven cavity 20. In certain embodiments, the reflectors are stainless steel. The top reflectors 26 and 28 are operable to reflect radiant heat emitted from the upper infrared heating elements 12 and 14 respectively toward the food item 24 to increase the efficiency of the heating elements.

In certain embodiments, the lower quartz heating elements 16 and 18 are located in the lower portion of the oven cavity 20. In certain embodiments, the lower quartz heating elements 16 and 18 are protected by heat shields 32 and 34, which may be located between the lower quartz heating elements 16-18 and the center of the oven cavity 20.

The upper infrared heating elements 12 and 14 are operable to emit radiant heat at a different wavelength from the radiant heat emitted by the lower quartz heating elements 16 and 18. In certain embodiments, the upper heating elements 12 and 14 emit radiant heat within a wavelength range of approximately and including 2500 nm which is considered by those skilled in the art to be medium spectrum wave lengths. In contrast, in certain embodiments, the lower quartz heating elements 16 and 18 emit radiant heat within a wavelength range of approximately 1000 to 1500 nm which is considered by those skilled in the art to be short spectrum wave length. When infrared heat is directed to the food item 24, the radiation is absorbed, reflected, and scattered. The present invention uses radiant heat at different wavelengths and different penetration depths into the food item 24, and therefore, may be suitable for different cooking purposes.

For example, the radiant heat from the top the infrared heating elements has a heat wave length of about 2500 nm which considered as a medium spectrum wave length (designed to concentrate on the external parts of the food item and make them crispier). In contrast, the heat from the bottom quartz heating elements has a radiant heat wave length is 1000-1500 nm which considered as a short spectrum wave length (designed to penetrate inside the food and cook them from inside out).

Additionally, absorption intensities at different wavelengths may differ due to the composition of the food item 24. Generally, the food item 24 is composed of water and organic compounds such as carbohydrates, proteins, and fat, and the different composition in different types of food may affect the absorption intensities. Therefore, radiant heat at different wavelengths may be used to enhance cooking quality and improve energy efficiency. Thus, it is possible to test multiple heating elements with different wavelengths on many types of food to determine the correct wave length and the correct heater type for cooking purposes. By using the experimental results, one can determine a proper wavelength combination for specific types of food. Thus, to provide the desired wavelengths of radiant heat combinations of heating elements can be tested. Additionally, the power ratings for the lowers and upper heaters may be selected to optimize cooking performance based on a variety of experimental results. For examples, if the top heating elements have a power rating too high (i.e., 600 watts), the surface of the food will burn too easily and the internal food will be raw. On the other hand if the lower heating elements have a power rating that is too high, the food will overcook internally and the external crust will be raw. In one embodiment of the present invention, each upper heating infrared element may be Halogen tubes rated at 120V and 450 watts. Each of the lower heating infrared elements may be quartz tube assembles rated at 120V and 300 watts.

By using an optimal combination of heating elements having different wave lengths and power ratings with software to control the temperature of the oven cavity, one can save 35 to 45 percent energy when compared to conventional ovens of this size and type.

The high efficiency oven 10 further comprises features to ensure better insulation to assist in achieving a high energy efficiency. For example, insulating strips, such as silicon ribs 38 may be positioned where the front door of the oven contacts the oven housing. Additionally, in certain embodiments, the door may be tempered and darkened (i.e., using a silk print technique) to minimize infrared reflection outside of the oven. In certain embodiments, the oven may be constructed such that gap between door and the oven housing is no more than 2.0 mm across the door. Insulation material 40 may be positioned on the top of the infrared oven 10 between the upper wall of the oven cavity 20 and the top wall of the oven. In certain embodiments, this insulation material is fiberglass. However, in other embodiments other insulative materials may be used, such as Aerogel. Additionally, the high efficiency oven 10 may comprise a double-layer back board 41 to increase insulation, and therefore, improve efficiency.

Referring to FIG. 2, at least one temperature sensor 42, such as a negative temperature coefficient (NTC) thermistor, may be used to measure the oven cavity temperature inside the oven cavity 20. In certain embodiments, the temperature sensor may be positioned inside the oven on an external face of a cavity wall. In such embodiments, the temperature sensor 42 is not positioned within the oven cavity 20 and thus, actually measures a lower temperature than the oven temperature. NTC thermistors are made from a pressed chip of a semiconductor such as a sintered metal oxide. Raising the temperature of the semiconductor increases the number of electrons charge. The more charge carriers that are available, the more current a material can conduct. Calibration can be made to determine the relationship between the produced current and temperature such as how much current one degree F. of temperature generate at the sensor. Thus, one may determine the temperature of the oven based on the temperature reported by the temperature sensor.

In certain embodiments, the temperature sensor 42 is placed in a location to measure the center of the oven where the food is located. In other embodiments, the exact location behind the back cavity wall 43 can be determined experimentally based on the configuration of a particular oven cavity to best represent the average temperature reading of the oven cavity.

In yet, other embodiments (not shown), the temperature sensor 42 may be a thermocouple and positioned with the over cavity 20 of the infrared oven 10. In yet other embodiments, one or more temperature sensors may be operable to measure the oven cavity temperature at multiple different locations in the oven cavity 20.

Figure 3:
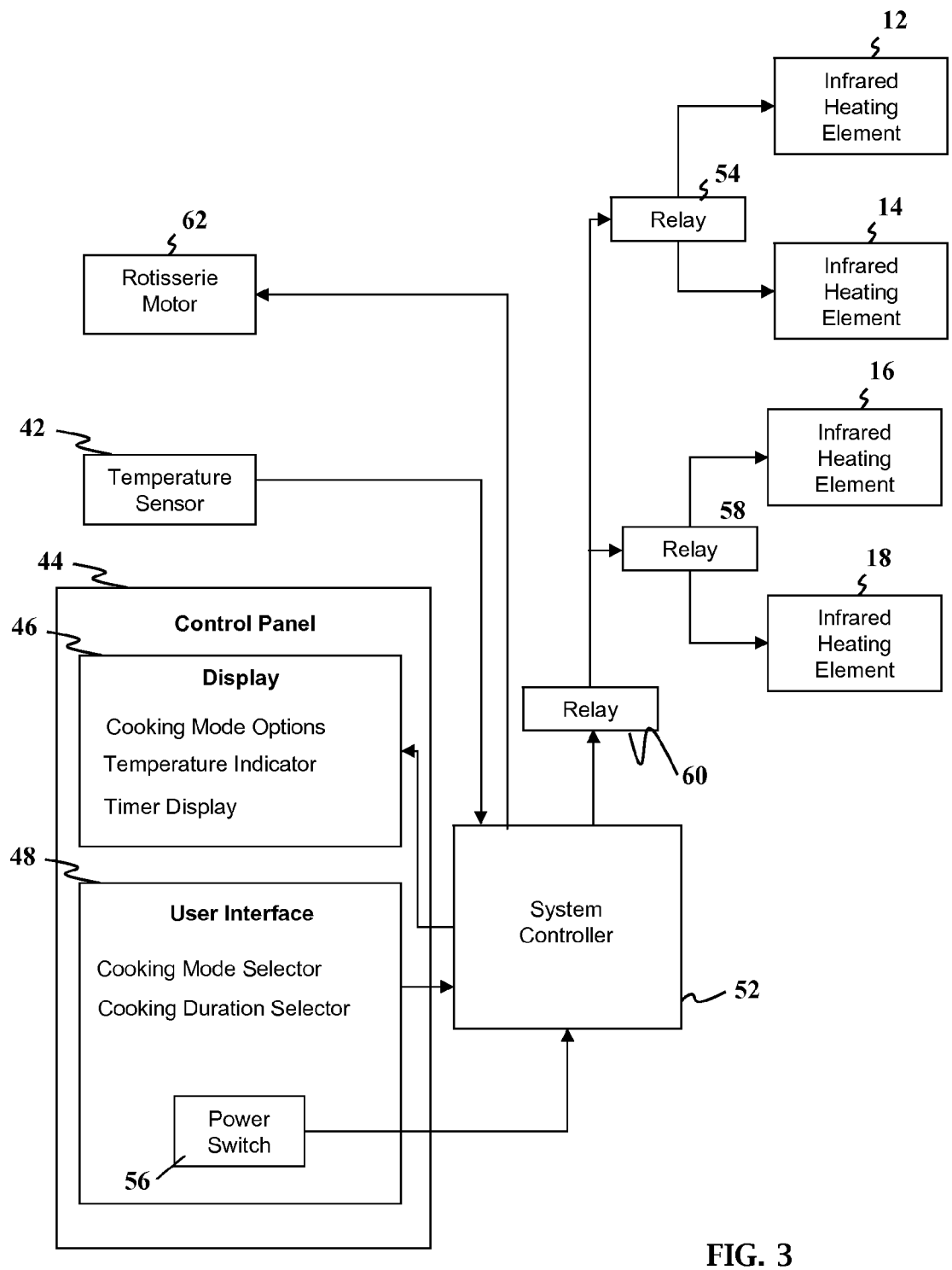
FIG. 3 is a simplified block diagram illustrating a high efficiency oven in accordance with one embodiment of the present disclosure.
Figure 3A:
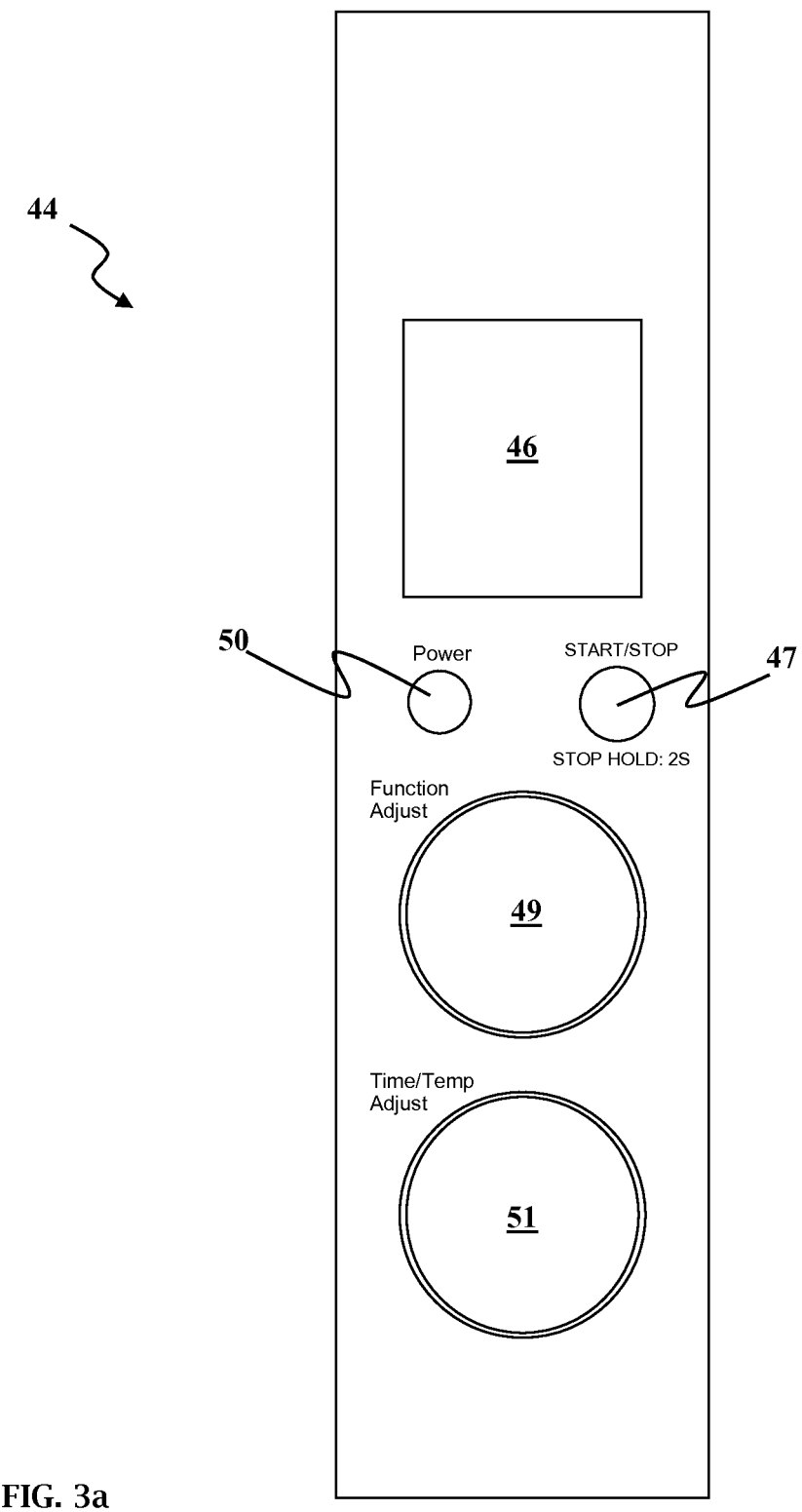
FIG. 3a is a front view of one embodiment of a control panel which may be used in a high efficiency oven.

FIG. 3 is a simplified block diagram illustrating schematic relationships between certain electrical components of an embodiment of the high efficiency oven 10. As shown in FIGS. 1, 3 and 3a, a control panel 44 is provided to enable user interaction with the high efficiency oven 10. In certain embodiments, the user control panel 44 comprises a display 46 and a user interface 48. The user interface 48 may comprise additional indicators or lights (such as a power indicator light 50), and buttons or knobs which allow the user to operate the oven 10 (such as a Start/Stop button 47). The various components of the display 46 may be arranged on a panel easily accessible to the user as indicated in FIG. 3a. In other embodiments, the display 46 may be a touch sensitive display (not shown) which allows the user to interface directly with the display thereby reducing the need for a separate user interface. In certain embodiments, the display 46 provides to the user a visual indication of available cooking mode options, a selected cooking mode, and values of cooking parameters, including a target stabilized temperature $T_S$ and a cooking duration. More details regarding one embodiment of the operation of the display 46 are described below with reference to FIG. 6.

The buttons and knobs on the user interface 48 may provide the user a cooking mode selector or function adjustment knob 49 to adjust the selected cooking mode or function. Because certain cooking parameters are user-adjustable, the control panel may allow the user to select user-adjustable parameters which include, for example, a cooking duration selector, a target stabilized temperature selector, and a toast shade selector. A time/temperature knob 51 may also be provided to allow the user to manually enter the cooking time and/or the temperature. In certain embodiments, the knob 51 may be toggled between time and temperature selection functions by pressing on the knob. The time or temperature may be adjusted by rotating the knob 51.

Referring to FIG. 3, the infrared oven 10 includes a system controller 52 comprising a microprocessor, micro-controller and/or other logic circuits including field programmable devices. During user input, the system controller 52 may receive user input such as the selected cooking mode or routine and user-adjusted cooking parameter values via the user interface 48. The system controller 52 may receive the oven cavity temperature from the temperature sensor 42. The system controller 52 controls the infrared heating elements 12, 14 using a power switch or relay 54 and the quartz heating elements 16, 18 using power switch or relay 58. In certain embodiments, the relays 54 and 58 may be manufactured by SANYOU (SANYOU part No. SRU-S-112DM rated at 10 amps and 100000 of life cycles).

In certain embodiments, switching the oven ON and OFF (i.e., the oven operation) is accomplished by using a start switch 56 coupled to the user interface 48 to energize the system controller 52, which in turn, energizes a third relay 60. In certain embodiments, the third or main relay 60 may be another SANYOU relay (e.g., a SANYOU 30 amp 250 Volts digital Relay). In certain embodiments, the main relay 60 and elements relays 54 and 58 may be placed in a circuit board. In certain embodiments, the circuit board may also be assembled by SANYOU (e.g., SANYOU part No. 125331-B Version 1.1 with UL certification #E 228731).

The circuit board also may include the system controller 52. When the user initiates a cooking routine by pressing the power switch 56, the main relay 60 and system controller 52 will energize. The main relay 60 is wired in series with the lower elements relay 54 and the upper elements relay 58. Both the lower elements relay 54 and upper elements relay 58 are normally closed, so when the main relay 60 is energized, then all of the heating elements will be energized at well.

As will be described below, the system controller 52 turns the infrared heating elements on and off using the power switches to modulate the oven cavity temperature. In certain embodiments, the system controller 52 may also control a rotisserie motor 62 (e.g. a rotisserie motor manufactured and tested at by ETI (Electric-Tech International CO in Zhohai City Guangdong, part no. 49TYD-500-2 run at 120 volts AC 50 HZ 6 watts run at 5 revolutions per minutes).

Furthermore, the system controller 52 is operable in response to the selected cooking mode. The selected cooking mode generally corresponds to a predefined cooking routine, and may include a function mode or a recipe mode. The system controller 52 may generate an array of cooking mode options, including both function mode options and recipe mode options. The user may select among function mode options Bake mode, Toast mode, Broil mode, and Rotisserie mode, for example. The user may also select among recipe mode options: Cake mode, Chicken mode, Cookie mode, Fish mode, Potato mode, and Pizza mode, for example.

The system controller 52 is further operable to respond to a selected set of cooking parameters. The selected set of cooking parameters may comprise different cooking parameters in response to the selected cooking mode. For example, if a particular temperature and cooking duration is selected by the user, the system controller retrieves certain cooking parameters from a database stored in a memory storage in communication with the system controller 52. Example cooking paramaters may include a target stabilized temperature $T_S$, an upper temperature range $T_{UR}$, and a lower temperature lower range $T_{LR}$.

Similarly, if the user-selected mode is the Toast mode, the user may enter a cooking parameter such as a toast shade. The selected set of cooking parameters may have predetermined values in response to the selected cooking mode.

Below is a table illustrating exemplary cooking modes and respective cooking parameters.

TABLE 1

| Cooking Mode | Default Target Stabilized Temperature ($T_S$) (° F.) | Default Cooking Duration (Minutes) | | Upper Range ($T_U$) | Lower Range ($T_L$) (° F.) | Maximum Difference ($T_U$ - $T_L$) (° F.) |
|---|---|---|---|---|---|---|
| Bake | 300 | 30 | | 320 | 300 | 40 |
| Toast | Default toast shade: Medium | Light | 145 sec | N/A | N/A | N/A |
|  |  | Medium | 330 sec | N/A | N/A | N/A |
|  | Default target stabilized | Dark | 490 sec | N/A | N/A | N/A |
|  | temperature: 400 |  |  |  |  |  |
| Broil | 450 | 15 | | 470 | 430 | 40 |
| Rotisserie | 350 | 60 | | 370 | 330 | 40 |
| Pizza | 400 | 60 | | 420 | 380 | 40 |
| Cake | 350 | 60 | | 370 | 330 | 40 |
| Chicken | 425 | 30 | | 445 | 405 | 40 |
| Cookie | 350 | 15 | | 370 | 330 | 40 |
| Fish | 325 | 25 | | 345 | 305 | 40 |
| Potato | 400 | 60 | | 420 | 380 | 40 |

In Table 1, the set of cooking parameters may have different predetermined values in response to the selected cooking mode. Furthermore, different cooking modes may be associated with different sets of cooking parameters. For example, cooking parameters associated with the Toast mode comprises a toast shade, which can be Light, Medium, or Dark. The default toast shade may be set to medium.

Figure 4:
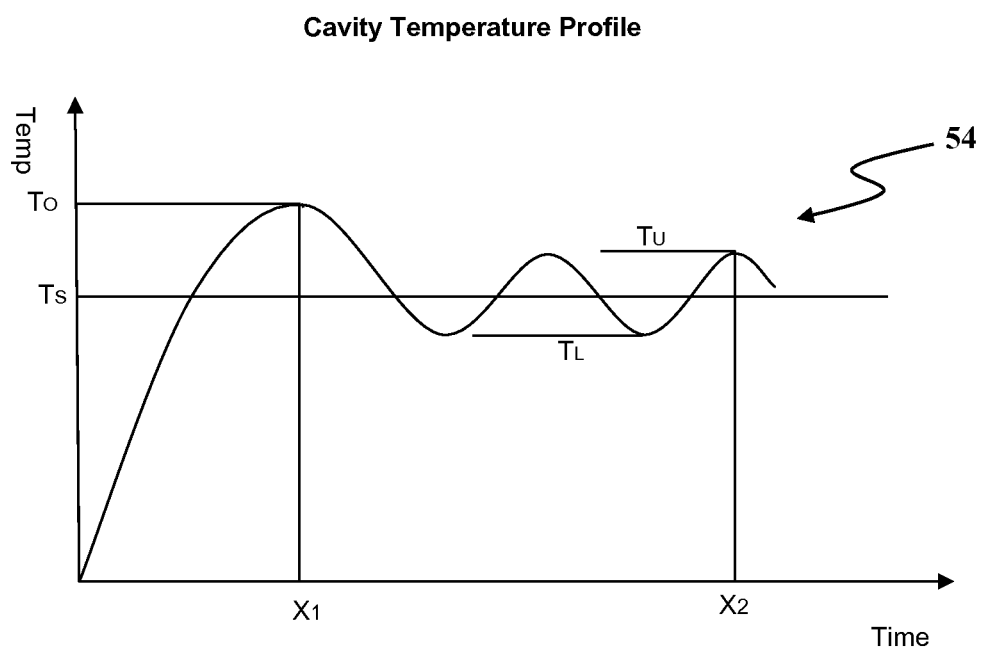
FIG. 4 is a time-temperature diagram illustrating a cavity temperature profile for a high efficiency oven in accordance with one embodiment of the present disclosure.

FIG. 4 is a time-temperature diagram illustrating a cavity temperature profile 54 for an embodiment of a high efficiency oven 10 according to aspects of the present disclosure. Rather than achieving a constant temperature profile which uses more energy and shortens the life of the infrared heating elements, the use of the cavity temperature profile 54 (or a similar profile) results in greater efficiency and longer heating element time.

An overshoot temperature $T_O$ may be defined as the maximum cavity temperature achieved during the initial heating cycle which corresponds to the heat up time $X_1$ (and, in some embodiments, may be shorter than 10 minutes). Further, the overshoot temperature $T_O$ may be at a value not exceeding a predetermined percentage (such as 10%) of the target stabilized temperature $T_S$. The target stabilized temperature $T_S$ of one heating cycle may be calculated by the formula $$\frac{T_U + T_L}{2},$$

where $T_U$ and $T_L$ are defined as the maximum oven cavity temperature and minimum oven cavity temperature respectively during the heating cycles. In certain embodiments, the stabilization time $X_2$ may be defined as the time when the values of the profile stabilized temperature $T_S$ from three consecutive heating cycles are within ±5° F. of each other.

Figure 5:
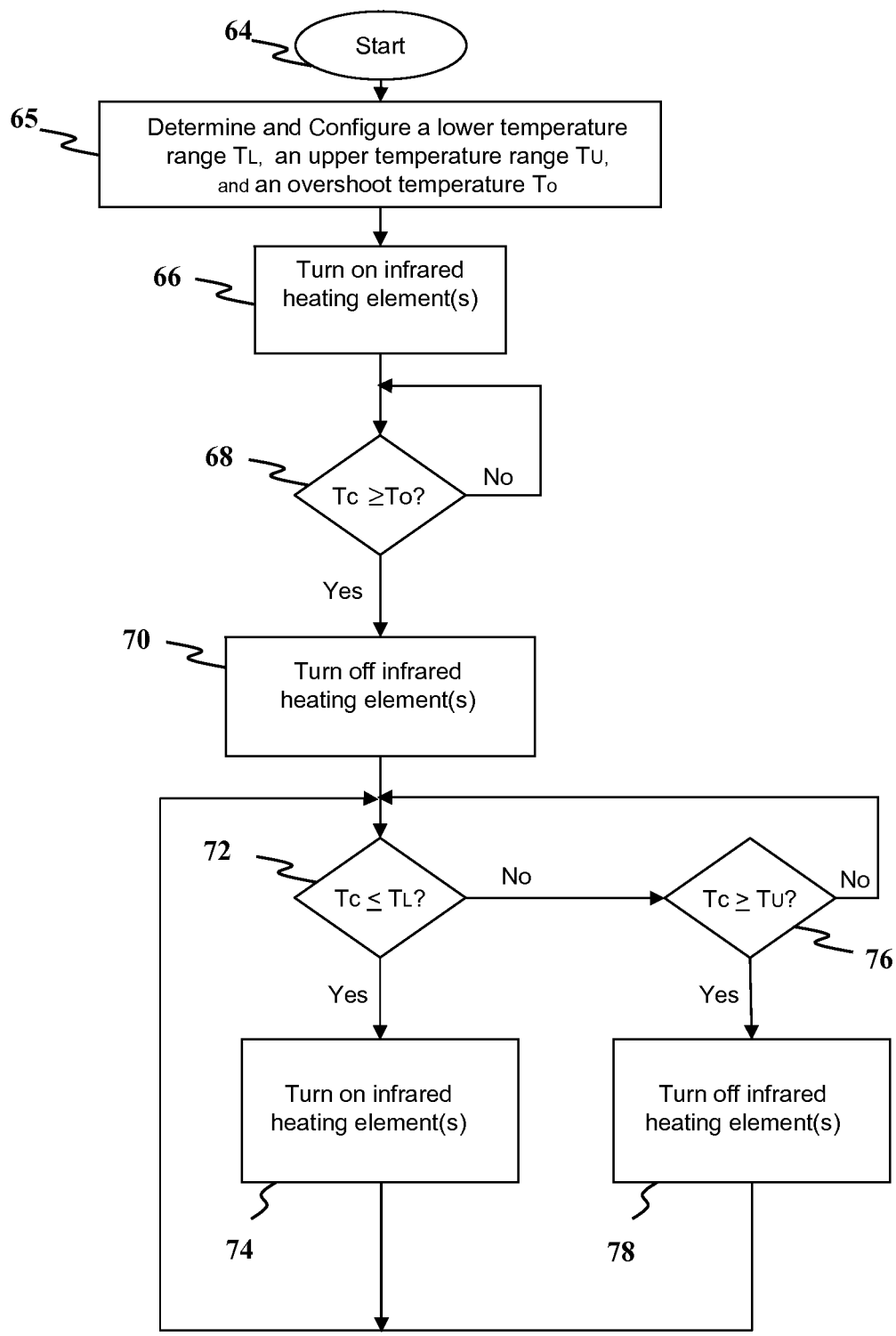
FIG. 5 is a flowchart of a method of independently controlling the infrared heating elements in a high efficiency oven in accordance with one embodiment of the present disclosure.

FIG. 5 is a flowchart of a method 64 for developing and maintaining the temperature profile 54. This exemplary process may be implemented within a system controller, such as the system controller 52 in the high efficiency oven 10.

The method 64 begins after the user sets the selected cooking mode, adjusts the cooking parameters, and starts the cooking routine. For instance, when a user selects the temperature target in the manual mode, or when the user selects an option on a menu with the preset temperature, and press the "start" button, the system controller 52 will energize. Once the stabilized or target temperature has been determined (either by a manual input or looking up a target temperature associated with a particular recipe mode), the system controller 52 retrieves the following predetermined parameters from the database: a lower temperature range $T_L$, an upper temperature range $T_U$, and an overshoot temperature $T_O$ in step 65 in response to the user-selected cooking mode and cooking temperature.

During the initial heating cycle, the system controller 52 switches on the heating elements 12, 14, 16, and 18 in step 66. In step 68, the system controller 52 receives the sensed oven cavity temperature $T_C$ from the temperature sensor 42, and compares it with the overshoot temperature $T_O$ at predetermined intervals. If the sensed oven cavity temperature $T_C$ has not reached the overshoot temperature $T_O$, the system controller 52 returns to step 68, and repeatedly checks at regular intervals, the updated oven cavity temperature $T_C$ until $T_C$ reaches the overshoot temperature $T_O$, which corresponds with time $X_1$ in FIG. 4. In response to $T_C \geq T_O$, the system controller 52 then turns off the heating elements 12, 14, 16, and 18 in step 70.

In step 72, the system controller 52 continues to receive the updated oven cavity temperature $T_C$ at regular intervals and compares the received cavity temperature with the lower temperature setpoint $T_L$. If the sensed oven cavity temperature $T_C$ is less than or equal to the lower temperature setpoint $T_L$, the system controller 52 turns on the heating elements 12, 14, 16, and 18 in step 74. Otherwise, the system controller 52 compares the sensed oven cavity temperature $T_C$ with the upper temperature range $T_U$ in step 76. The system controller 52 turns off the infrared heating elements 12, 14, 16, and 18 if the sensed oven cavity temperature $T_C$ is greater than or equal to the upper temperature range $T_U$ in step 78.

Following step 76, if the sensed oven cavity temperature $T_C$ is between $T_L$ and $T_U$, the system controller 52 does not adjust the infrared heating elements and loops back to step 72. The system controller 52 also returns to step 72 following step 74 and step 78, after the system controller 52 has adjusted the infrared heating elements in response to the sensed oven cavity temperature $T_C$. The process then repeats steps 72 through 78 at regular intervals. Thus, the oven cavity temperature $T_C$ is maintained within the desired cooking temperature range. This process flow repeats to maintain the stabilized target temperature until the desired cooking duration is achieved.

The method 64 of FIG. 5 is exemplary and assumes that all heating elements are used in implementing the method. This assumption is true for modes such as the bake mode and several of the recipe modes (discussed below in reference to FIG. 9). However, when using the Broil mode, the method 64 may be used, but only the top heating elements 12 and 14 are energized. Similarly, when using the Rotisserie Mode, all the heating elements are used, but the rotisserie motor 62 is also activated during the implementation of the method 64.

Using the method 64 results in other efficiencies. For instance, if a user toasted a slice of bread using the Toast option, the method 64 will use a predetermined time and the temperature, then shut the oven off (e.g., for 5 minutes). However, if the user decides to use the oven again for another slice of toast, the method 64 will receive a temperature reading that the oven is still hot and will, thus, automatically reduce the length of toasting (e.g, 4 minutes). In other words, because the method receives a temperature reading, the method realizes that no preheat is necessary and will reduce the cooking time. Thus, the method 64 is dynamically designed to work with the time, upper and lower power, and temperature as well with the designed wattages, length waves.

When controlling the heating elements in response to the oven cavity temperature to achieve both high efficiency and good cooking performance, the system controller 52 utilizes the characteristics of infrared radiant heat. In conventional ovens, heat is typically generated outside of the food item and is conveyed to cook the food item by convection of hot air or by thermal conduction. Therefore, very small or no variation in the oven cavity temperature is desirable to achieve evenness of cooking. Infrared heating elements transfer heat energy directly to the food through medium waves which do not require much, if any air to transfer this energy. Thus, the stability of oven cavity temperature is not crucial when using infrared technology.

The radiant heat energy generated by the infrared heating elements is absorbed by the food. Because the infrared radiant heat may permeate and heat the inside of the food item 24, the infrared oven 10 may not require a perfectly consistent oven cavity temperature to achieve cooking evenness and satisfactory performance. The high efficiency oven 10 described herein allows oven cavity temperature variation within a predetermined range. In some embodiments, the heating elements may be off for three to five minutes in response to the comparison of the sensed oven cavity temperature $T_C$ to overshoot temperature $T_O$ and upper temperature range $T_U$. By controlling the infrared heating elements in response to the sensed oven cavity temperature $T_C$, the high efficiency oven 10 improves energy efficiency without reducing cooking performance. By monitoring the oven cavity temperature $T_C$, the high efficiency oven 10 may reduce the risk of undercooking or overcooking, even when food type or amount information provided by the user is not accurate. Furthermore, by adjusting the infrared heating elements only when the sensed oven cavity temperature $T_C$ is outside of the desired cooking temperature range, the reliability and product life of the infrared heating elements and the infrared oven are improved.

Figure 6:
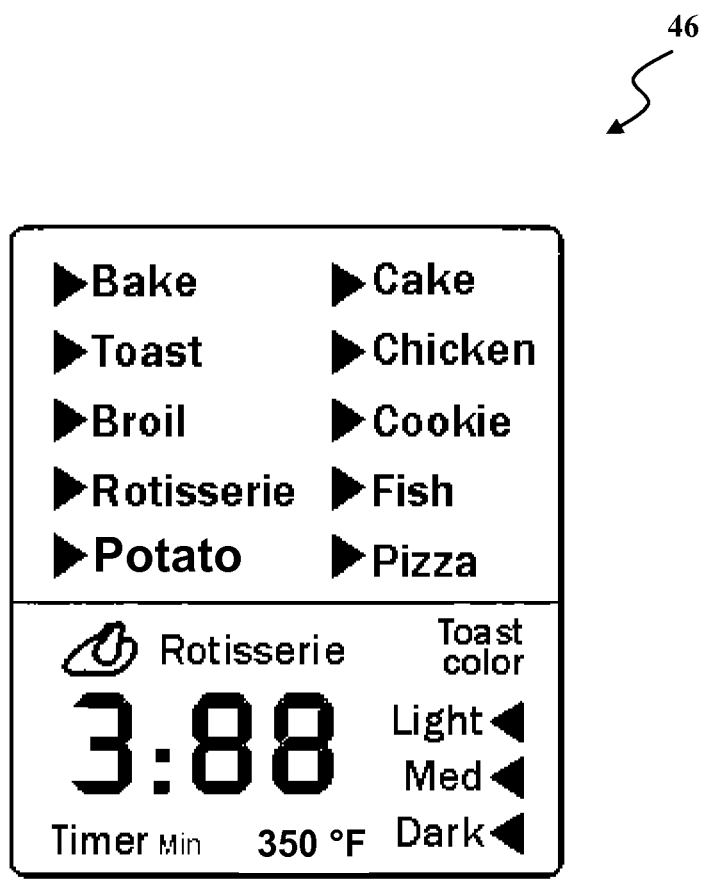
FIG. 6 is an exemplary configuration of a display of a high efficiency oven in accordance with one embodiment of the present disclosure.

FIG. 6 is an exemplary configuration of the display 46 of the high efficiency oven 10. As shown in FIG. 6, an upper portion of the display 46 displays an array of cooking mode options, including function mode options (Bake mode, Toast mode, Broil mode, and Rotisserie mode) and recipe mode options (Cake mode, Chicken mode, Cookie mode, Fish mode, Potato mode, and Pizza mode). A lower portion of the display 46 displays a selected cooking mode, a cooking duration, and a target stabilized temperature. The lower portion of the display 46 also may display the toast shade if the selected cooking mode is the Toast mode.

Figure 7:
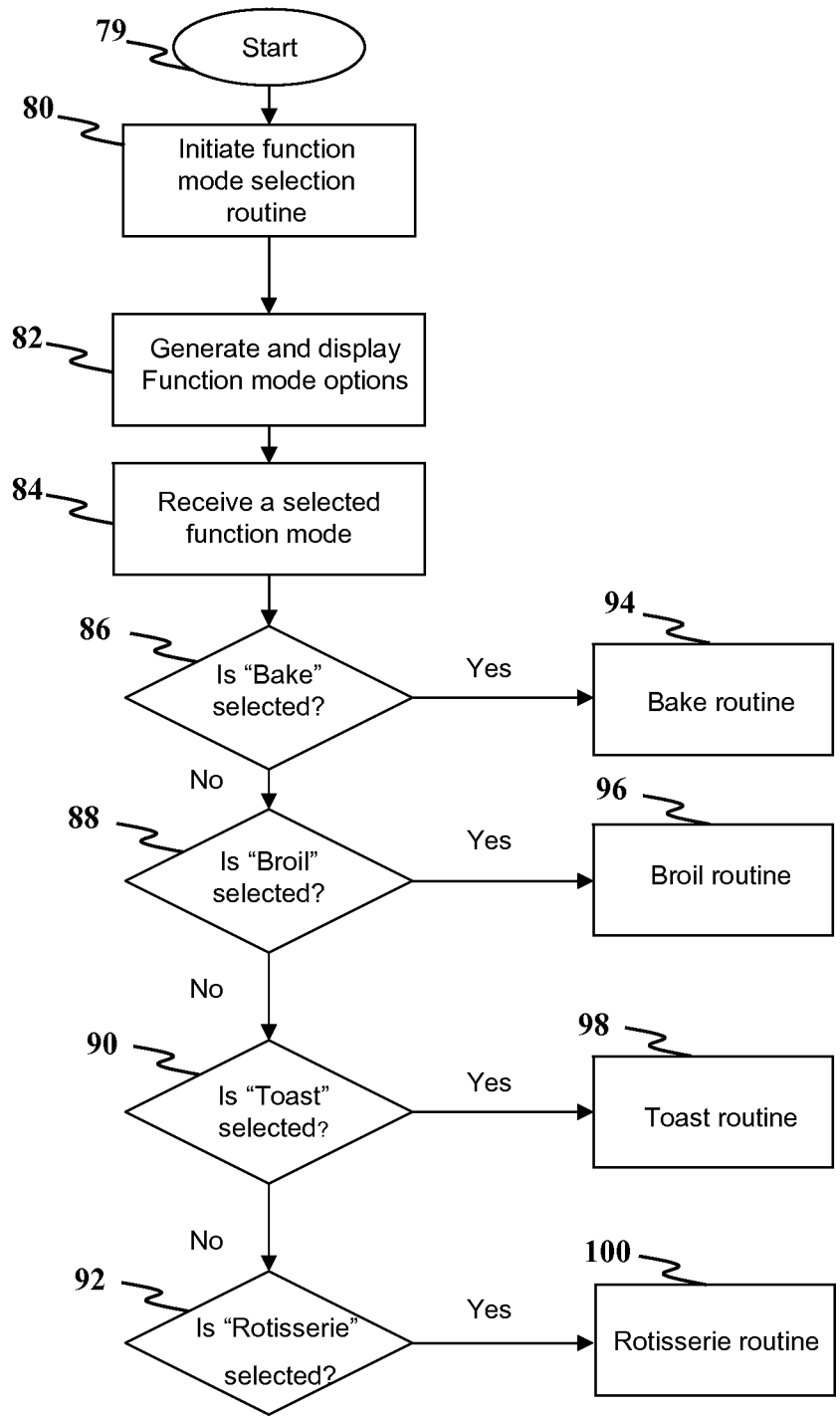
FIG. 7 is a flowchart of a method for operating a function mode selection routine of a high efficiency oven in accordance with one embodiment of the present disclosure.

FIG. 7 is a flowchart of a method 79 for operating a function mode selection routine of the high efficiency oven 10 in accordance with one embodiment of the present disclosure. After the system controller 52 initiates the function mode selection routine in step 80, it generates an array of function mode options including Bake mode, Broil mode, Toast mode, and Rotisserie mode, and sends this information to the display 46 to display these function mode options in step 82. Through the user interface 48, the system controller 52 may receive a user-selected function mode in step 84. In steps 86, 88, 90, and 92, the system controller 52 determines if one of these respective cooking function modes is selected and initiates the appropriate respective cooking routine in steps 94, 96, 98, and 100.

For instance, in step 86, the logic in the system controller 52 checks to see if the "Bake mode" has been selected, if yes, the system controller 52 executes the "Bake Routine" 94. If not, the process flows to step 88. In step 88, the logic in the system controller 52 checks to see if the "Broil mode" has been selected, if yes, the system controller 52 executes the "Broil Routine" 96. If not, the process flows to step 90. In step 90, the logic in the system controller 52 checks to see if the "Toast mode" has been selected, if yes, the system controller 52 executes the "Toast Routine" 98. If not, the process flows to step 92. In step 92, the logic in the system controller 52 checks to see if the "Rotisserie mode" has been selected, if yes, the system controller 52 executes the "Rotisserie Routine" 100. If not, the process awaits user input. After a predetermined amount of time, the process will return to a default state which will require new user input to start the process.

Figure 8:
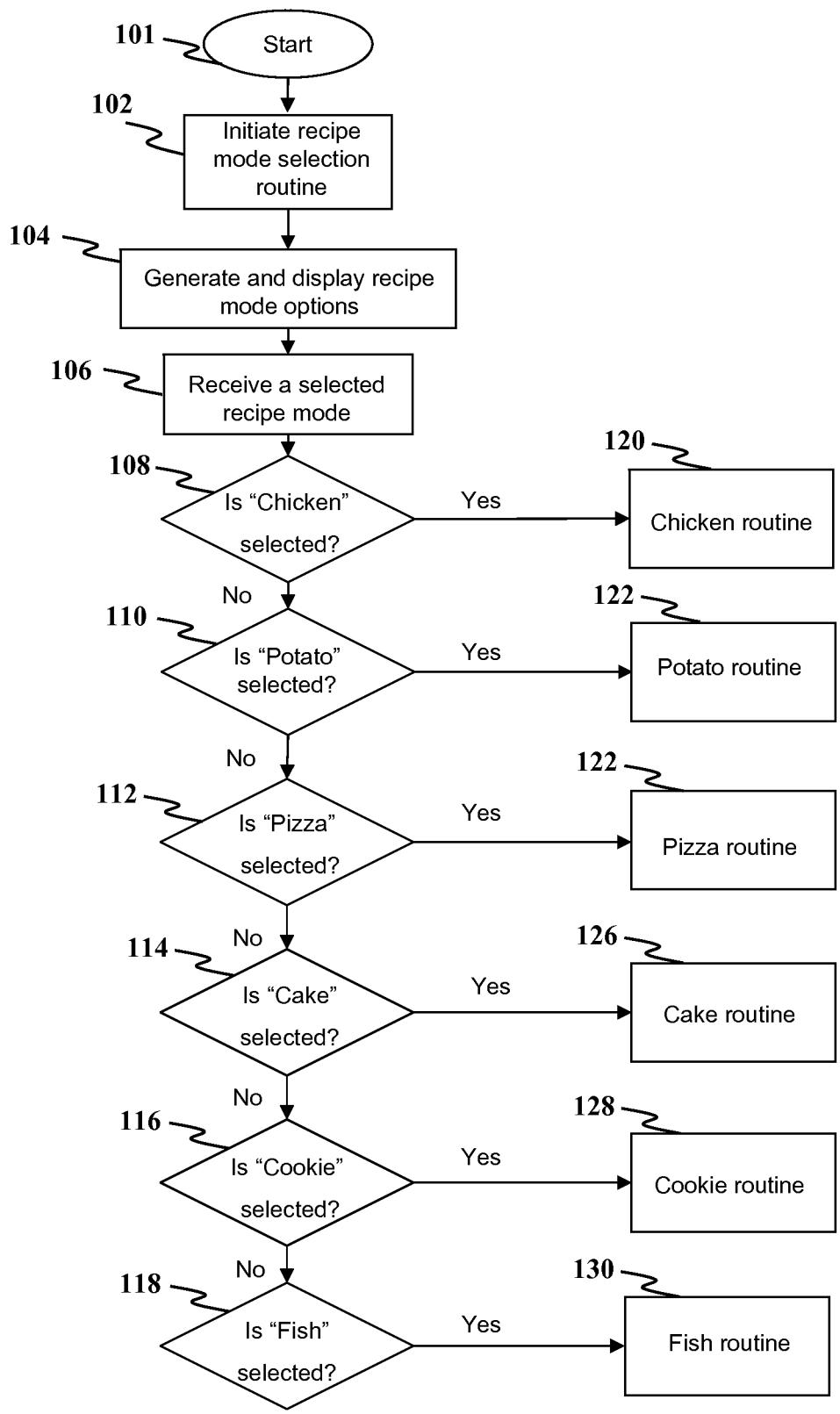
FIG. 8 is a flowchart of a method for operating a recipe mode selection routine of a high efficiency oven in accordance with one embodiment of the present disclosure.

Similarly, FIG. 8 is a flowchart of a method 101 for operating a recipe mode selection routine of the high efficiency oven 10 in accordance with one embodiment of the present disclosure. After the system controller 52 receives a appropriate user response from the control panel 44, the system controller 52 initiates the recipe mode selection routine in step 102, it generates an array of recipe mode options including Chicken mode, Potato mode, Pizza mode, Cake mode, Cookie mode, and Fish mode, and sends the information to the display 46 in FIG. 3 to display these recipe mode options in step 104. Through the user interface 48, the system controller 52 may receive a user-selected recipe mode in step 106. In steps 108, 110, 112, 114, 116, and 118, the system controller 52 determines if one of these respective cooking recipe modes is selected and initiates the appropriate respective cooking routine in steps 120, 122, 124, 126, 128, and 130.

For instance, in step 108, the logic in the system controller 52 checks to see if "Chicken" has been selected, if yes, the system controller 52 executes the "Chicken Routine" 120. If not, the process flows to step 110. In step 110, the logic in the system controller 52 checks to see if the "Potato" has been selected, if yes, the system controller 52 executes the "Potato Routine" 122. If not, the process flows to step 112. In step 112, the logic in the system controller 52 checks to see if the "Pizza" has been selected, if yes, the system controller 52 executes the "Pizza Routine" 122. If not, the process flows to step 114. In step 114, the logic in the system controller 52 checks to see if "Cake" has been selected, if yes, the system controller 52 executes the "Cake Routine" 126. If not, the process flows to step 116. In step 116, the logic in the system controller 52 checks to see if "Cookie" has been selected, if yes, the system controller 52 executes the "Cookie Routine" 128. If not, the process flows to step 118. In step 118, the logic in the system controller 52 checks to see if "Fish" has been selected, if yes, the system controller 52 executes the "Fish Routine" 130. If not, the process awaits user input. After a predetermined amount of time, the process will return to a default state which will require new user input to start the process.

Figure 9:
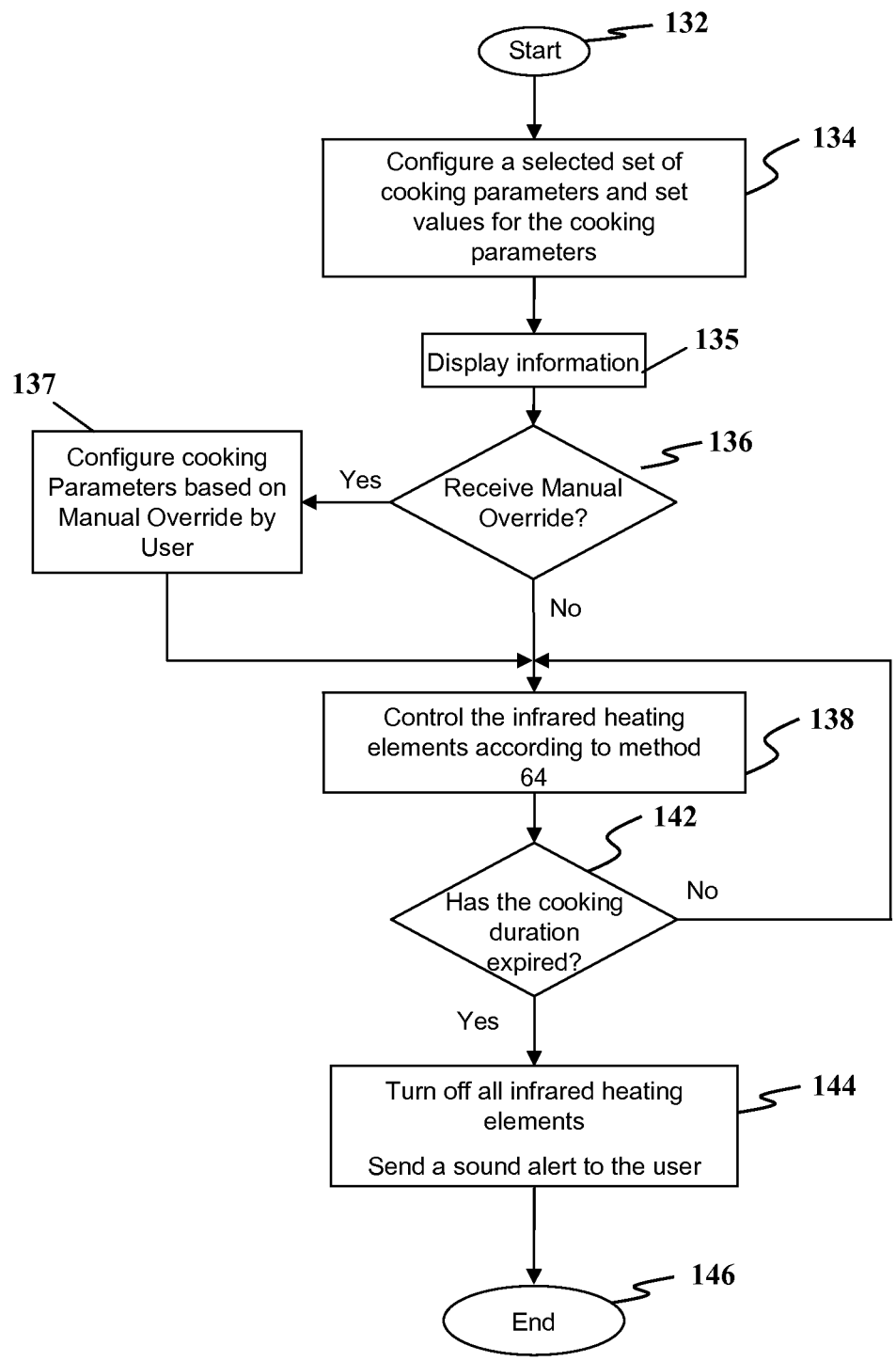
FIG. 9 is a flowchart of a method for operating a cooking routine in response to a selected cooking mode in a high efficiency oven in accordance with one embodiment of the present disclosure.

FIG. 9 is a flowchart of a method 132 for operating a cooking routine in response to a selected cooking mode (as described above in reference to FIG. 7) or a selected recipe mode (as described above in reference to FIG. 8) in the high efficiency oven 10 in accordance with one embodiment of the present disclosure. After the system controller 52 receives the selected cooking mode signal from the user interface 48, it can select the corresponding cooking routine (e.g, the Broil Routine 96 of FIG. 7 or the Chicken Routine 120 of FIG. 8). For any given routine, the system controller 52 retrieves preconfigured values for cooking parameters from a memory storage device. The cooking parameters may be $T_O$, $T_S$, $T_U$, $T_L$, $X_1$, and $X_2$ (See Table 1, above). These values are then programmed into the appropriate process to carry out the selected routine in step 136. As discussed above with reference to FIG. 7 and FIG. 8, the selected cooking routine may be Bake routine, Broil routine, Rotisserie routine, Toast routine, Potato routine, Cake routine, Chicken routine, Cookie routine, or Fish routine. Different cooking parameters may be configured in response to the selected cooking routine. See Table 1 above for typical values for all routines. In other words, if the selected routine is "Cake Routine," the following values of Table 2 are retrieved and used in the appropriate process to cook a cake.

TABLE 2

| Cooking Mode | Default Target Stabilized Temperature ($T_S$) | Default Cooking Duration (Minutes) | Upper Range ($T_U$) | Lower Range ($T_L$) (° F) | Maximum Difference ($T_U - T_L$) |
|---|---|---|---|---|---|
| Cake | 350(° F) | 60 | 370(° F) | 330(° F) | 40(° F) |

The system controller 52 may send a notification and certain information to the display 46 to display the selected cooking mode and values of some cooking parameters in step 135, such as the cooking mode, default temperature, and default cooking time. At this point, the user may override certain cooking parameters, such as the default cooking time or default (i.e. target) temperature.

In step 136, the system controller 52 determines whether such manual overrides are selected by the user. If yes, the system controller 52 reconfigures the cooking procedure based on the parameters inputted by the user (step 137). If not, the process flows to step 138.

In step 138, the system controller 52 then controls the heating elements in accordance with the cooking parameter values retrieved in step 134 and procedure 64 discussed above in reference to FIGS. 4, and 5.

If the cooking duration has not expired as determined in step 142, the system controller 52 returns to step 138, and repeats steps 138 and 142 at regular intervals (i.e., 5 seconds) until the cooking duration has expired. If the cooking duration has expired, the system controller 52 turns off all heating elements and sends a sound alert to the user in step 144. The cooking routine ends in step 146.

Figure 10:
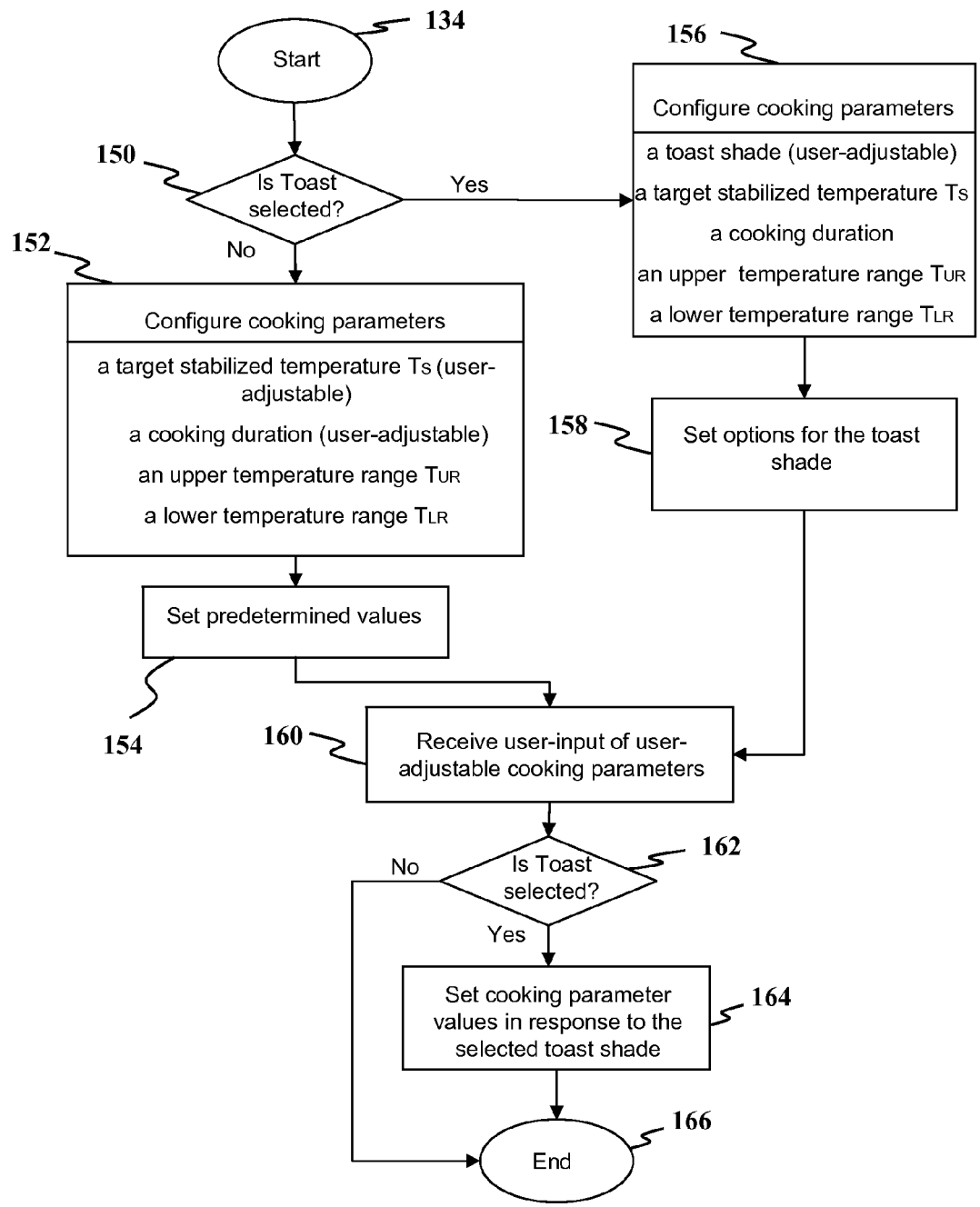
FIG. 10 is a flowchart of a method for configuring a selected set of cooking parameters and setting values for the cooking parameters when operating a cooking routine of a high efficiency oven in accordance with one embodiment of the present disclosure.

FIG. 10 is an exemplary flowchart of a method 134 for configuring a selected set of cooking parameters and setting values for the cooking parameters (such as described in Table 1 above) in response to the user-selected cooking mode for Toast. Method 134 begins with the system controller 52 checking whether the Toast mode is selected in step 150. If the selected cooking mode is not the Toast mode, the system controller 52 determines a target stabilized temperature $T_S$, a cooking duration, an upper temperature range $T_U$, and a lower temperature range $T_L$ in cooking parameters in step 152. The target stabilized temperature $T_S$ and the cooking duration may be adjusted by a user. The system controller 52 then sets predetermined values for the cooking parameters in response to the selected cooking mode in step 154.

If the selected cooking mode is the Toast mode, the system controller 52 may determine the cooking parameters as in step 152 and additionally include a toast shade in cooking parameters in step 156. The system controller 52 sets the toast shade options to include Light, Medium, or Dark in step 158. The default value of the toast shade may be set to Medium, for example. A user may adjust the value of the toast shade using the user interface 48.

Following step 154 and step 158, having set the predetermined values for the selected set of cooking parameters, the system controller 52 may receive user-input for user-adjustable cooking parameters in step 160 through the user interface 48. If the selected cooking mode is the Toast mode as determined in step 162, the system controller 52 configures values of the cooking parameters in response to the selected toast shade by the user in step 164. The method 134 ends in step 166.

In summary, aspects of the present invention provide a high efficiency oven. With the high efficiency oven, consumers may achieve both high efficiency cooking and high cooking performance. The high efficiency oven may also reduce the risk of undercooking or overcooking, even when food type or amount information provided by the user is in-accurate. Additionally, the high efficiency oven may achieve better reliability and longer product life because the infrared heating elements may be adjusted only when the oven cavity temperature is outside of the desired cooking temperature range.

The foregoing disclosure provides many different embodiments, or examples, for implementing different features of the invention. Specific examples of components and arrangements are described above to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Spatially relative terms, such as "beneath," "below," "lower," "above," "upper" and the like, may be used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Further, the foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

For instance, in one embodiment, there may be a cooking apparatus, comprising: an oven cavity; first and second infrared heating elements located inside the oven cavity; a temperature sensor positioned spaced away from the first and second infrared heating elements operable to measure the oven cavity temperature; and a system controller operable to independently control the first and second infrared heating elements in response to the oven cavity temperature.

Additionally, there may be a cooking apparatus as described above, wherein the system controller turns on at least one of the first and second infrared heating elements in response to the oven cavity temperature being less than a lower temperature range, and turns off at least one of the first and second infrared heating elements in response to the oven cavity temperature being more than an upper temperature range.

There may also be the cooking apparatus as described above, wherein the system controller is operable in response to a selected cooking mode and the upper temperature range and the lower temperature range are configured in accordance with the selected cooking mode.

In some embodiments, there may also be the cooking apparatus of as described above, wherein the system controller is operable in response to a selected set of cooking parameters.

In some embodiments, there may also be the cooking apparatus of as described above, wherein the selected set of cooking parameters comprises: a target stabilized temperature; a cooking duration; an upper temperature range; and a lower temperature lower range.

In some embodiments, there may also be the cooking apparatus of as described above wherein the selected set of cooking parameters have predetermined default values in accordance with a selected cooking mode.

In some embodiments, there may also be the cooking apparatus of as described above, wherein the target stabilized temperature and the cooking duration are user-adjustable cooking parameters.

In some embodiments, there may also be the cooking apparatus of as described above, wherein the temperature sensor comprises a thermocouple and is positioned to measure the oven cavity temperature at a specific location inside the oven cavity.

In some embodiments, there may also be the cooking apparatus as described above, wherein: the first infrared heating element disposed in the top portion of the oven cavity; the second infrared heating element disposed in the bottom portion of the oven cavity; and the first and second infrared heating elements operable to emit radiant heat at different infrared wavelengths.

In some embodiments, there may also be the cooking apparatus as described above, comprising at least two infrared heating elements disposed in the top portion of the oven cavity, and at least two infrared heating elements disposed in the bottom portion of the oven cavity.

In some embodiments, there may also be the cooking apparatus as described above, wherein the first infrared heating element comprises a halogen infrared heating element; and the second infrared heating element comprises a quartz infrared heating element.

In some embodiments, there may also be the cooking apparatus as described above, further comprising a first reflector located between an inside wall of the oven cavity and the first infrared heating element; and a second reflector located between another inside wall of the oven cavity and the second infrared heating element.

In some embodiments, there may also be the cooking apparatus of as described above, further comprising a control panel including: a display operable to convey information and programming options, including cooking mode options and cooking parameters; and a user interface operable to receive user-input of a selected cooking mode and user-adjustable cooking parameters.

In other embodiments, there may be methods for cooking food, such as: a method for cooking food, comprising: receiving an oven cavity temperature in a location spaced away from first and second infrared heating elements; and independently controlling the first and second infrared heating elements to be turned on and off in response to the oven cavity temperature.

In some embodiments, there may also be the method as described above, wherein independently controlling the first and second infrared heating elements comprises: turning on at least one of the first and second infrared heating elements in response to the oven cavity temperature being less than a lower temperature range; and turning off at least one of the first and second infrared heating elements in response to the oven cavity temperature being more than an upper temperature range.

In some embodiments, there may also be the method as described above, further comprising: receiving a selected cooking mode; configuring a selected set of cooking parameters in response to the selected cooking mode; configuring predetermined default values for the selected set of cooking parameters in response to the selected cooking mode; receiving user input for user-adjustable cooking parameters; and configuring the lower temperature range and upper temperature range in accordance with the selected cooking mode and the selected set of cooking parameters.

In some embodiments, there may also be the method of as described above, further comprising: configuring a selected set of cooking parameters to include a target stabilized temperature, an upper temperature range, a lower temperature range and a cooking function.

What is claimed is:

1. A counter-top oven, comprising:
    an oven cavity having at least one interior wall,
    a food rack removably positioned within the oven cavity,
    at least one medium spectrum wavelength infrared heating element positioned within the oven cavity,
    at least one reflector positioned between the at least one medium spectrum wavelength infrared heating element and the food rack, and further adapted to reflect radiant heat from the at least one medium spectrum wavelength infrared heating element to the food rack,
    at least one short spectrum wavelength infrared heating element positioned within the oven cavity,
    at least one reflector positioned between the at least one short spectrum wavelength infrared heating element and the food rack, and further adapted to reflect radiant heat from the at least one short spectrum wavelength infrared heating element to the interior wall of the oven cavity,
    a system controller in electrical communication with the at least one medium spectrum wavelength infrared heating element and the at least one short spectrum wavelength infrared heating element,
    a user interface in electrical communication with the system controller,
    a memory coupled to the system controller, wherein the memory contains a database of cooking routines stored in the memory for use by the system controller to control the operation of the at least one medium spectrum wavelength heating element and the at least one short spectrum wavelength infrared heating element, wherein each cooking routine corresponds to a variable temperature profile for the oven cavity,
    a temperature sensor positioned in proximity to the oven cavity in electrical communication with the system controller,
    wherein the system controller can control the operation of the at least one medium spectrum wavelength infrared heating element and the operation of the at least one short spectrum wavelength infrared heating element based on at least one of the variable temperature profiles.

2. The counter-top oven of claim 1, further comprising:
    a second medium spectrum wavelength infrared heating element positioned within the oven cavity,
    at second reflector positioned in proximity to the second medium spectrum wavelength infrared heating element and adapted to reflected radiant heat from the second medium spectrum wavelength infrared heating element to the food rack,
    a second short spectrum wavelength infrared heating element positioned within the oven cavity,
    a second reflector positioned in proximity to the second short spectrum wavelength infrared heating element and adapted to reflected radiant heat from the second short spectrum wavelength infrared heating element to the interior wall of the oven cavity,
    wherein the system controller can also control the operation of the second medium spectrum wavelength infrared heating element and the operation of the second short spectrum wavelength infrared heating element based on the variable temperature profile.

3. The counter-top oven of claim 1, wherein the user interface is adapted to allow the system controller to receive an indication of a selected cooking routine from a user.

4. The counter-top oven of claim 1, wherein a user interface is adapted to display certain user adjustable cooking values corresponding to the selected cooking routine.

5. The counter-top oven of claim 1, wherein the user interface is adapted to receive an indication of an adjusted user adjustable cooking value from a user.

6. The counter-top oven of claim 1, further comprising a first relay electrically coupled to the at least one medium wavelength infrared heating element and in electrical communication with the system controller.

7. The counter-top oven of claim 1, further comprising a second relay electrically coupled to the at least one short wave infrared heating element and in electrical communication with the system controller.

8. The counter-top oven of claim 7, further comprising a master relay electrically coupled to the first relay and the second relay and in electrical communication with the system controller.

9. The counter-top oven of claim 1, further comprising a rotisserie motor in electrical communication with the system controller.

10. The counter-top oven of claim 2, wherein the medium spectrum infrared heating elements are Halogen tubes capable of emitting medium spectrum wavelengths.

11. The counter-top oven of claim 2, wherein the short wave spectrum infrared heating elements are quartz tube assembles capable of emitting short spectrum wavelengths.

* * * * *